United States Patent
Chen et al.

(10) Patent No.: US 12,394,393 B2
(45) Date of Patent: Aug. 19, 2025

(54) DISPLAY SYSTEM AND OPERATION METHOD FOR DISPLAY SYSTEM

(71) Applicant: Wistron Corporation, New Taipei (TW)

(72) Inventors: Jiasheng Chen, New Taipei (TW); Junxin Qiu, New Taipei (TW); Yongqiang Li, New Taipei (TW); Yongbo Li, New Taipei (TW); Xinrui Liu, New Taipei (TW); Yupeng Zhang, New Taipei (TW)

(73) Assignee: Wistron Corporation, New Taipei (TW)

( * ) Notice: Subject to any disclaimer, the term of this patent is extended or adjusted under 35 U.S.C. 154(b) by 36 days.

(21) Appl. No.: 18/527,337

(22) Filed: Dec. 3, 2023

(65) Prior Publication Data

US 2025/0118274 A1 Apr. 10, 2025

(30) Foreign Application Priority Data

Oct. 9, 2023 (CN) .......................... 202311301969.8

(51) Int. Cl.
*G09G 5/00* (2006.01)
*G06F 3/14* (2006.01)
*G09G 3/20* (2006.01)
*G09G 3/36* (2006.01)
(Continued)

(52) U.S. Cl.
CPC .......... *G09G 5/006* (2013.01); *G06F 3/1423* (2013.01); *G06F 3/1446* (2013.01); *G09G 3/2092* (2013.01); *G09G 3/2096* (2013.01); *G09G 3/3696* (2013.01); *G09G 5/003* (2013.01); *G09G 2300/02* (2013.01); *G09G 2300/026* (2013.01); *G09G 2360/04* (2013.01);
(Continued)

(58) Field of Classification Search
CPC ...... G09G 5/003; G09G 5/006; G09G 3/2092; G09G 3/2096; G09G 3/3696; G09G 2300/00; G09G 2300/02; G09G 2300/026; G09G 2360/04; G09G 2370/22; G06F 3/1423; G06F 3/1446; H04N 7/10; H04N 7/104; H04N 17/00
USPC ........................................................ 345/204
See application file for complete search history.

(56) References Cited

U.S. PATENT DOCUMENTS

| | | | |
|---|---|---|---|
| 10,592,192 B2 | 3/2020 | Kim et al. | |
| 10,754,412 B2* | 8/2020 | Nakadokoro | G09G 5/006 |
| 11,223,797 B2* | 1/2022 | Yamamoto | H04N 17/00 |

(Continued)

FOREIGN PATENT DOCUMENTS

| | | |
|---|---|---|
| CN | 110073666 | 7/2019 |
| CN | 111681617 | 9/2020 |

*Primary Examiner* — Jason M Mandeville
(74) *Attorney, Agent, or Firm* — JCIPRNET

(57) ABSTRACT

A display system and an operation method for the display system are provided. The display system includes a first display and a second display. The first display includes a first input port and a first output port. The second display includes a second output port, a detection circuit, a processor, and a connection prompt circuit. The detection circuit drives the second output port in response to the driving signal. The processor receives the detection signal on the second output port, and determines a connection state of the second output port according to a level of the detection signal. The connection prompt circuit controls the second display to output a connection prompt image according to the connection state.

19 Claims, 12 Drawing Sheets

(51) Int. Cl.
  *H04N 7/10* (2006.01)
  *H04N 17/00* (2006.01)
(52) U.S. Cl.
  CPC ........... *G09G 2370/22* (2013.01); *H04N 7/10* (2013.01); *H04N 17/00* (2013.01)

(56) References Cited

U.S. PATENT DOCUMENTS

| | | | |
|---|---|---|---|
| 2018/0165051 A1 | 6/2018 | Kim et al. | |
| 2018/0181177 A1* | 6/2018 | Fukute | H04N 1/00901 |
| 2018/0292880 A1* | 10/2018 | Nakadokoro | G06F 1/266 |
| 2020/0413005 A1* | 12/2020 | Yamamoto | H04N 7/104 |
| 2021/0097007 A1* | 4/2021 | Shiba | G06F 13/385 |

* cited by examiner

DISPLAY SYSTEM AND OPERATION METHOD FOR DISPLAY SYSTEM

CROSS-REFERENCE TO RELATED APPLICATION

This application claims the priority benefit of China application serial no. 202311301969.8, filed on Oct. 9, 2023. The entirety of the above-mentioned patent application is hereby incorporated by reference herein and made a part of this specification.

BACKGROUND

Technical Field

The invention relates to an electronic system and an operation method for the electronic system, and particularly relates to a display system and an operation method for the display system.

Description of Related Art

Along with development of display technology, displays have more usage scenarios. Multi-screen connection of multiple displays may bring wide viewing angles, better sense of immersion and multi-window display and processing. Multi-screen connection of multiple displays has become a necessity for multi-service operations in offices, games, film and television and other industries. However, the subsequent high complexity of multiple displays, multiple interfaces, and multiple connections makes it difficult for users to identify multiple input and output interfaces of multiple displays. Therefore, a chance of connection errors increases. In the case of connection error, the displays may only display an abnormal image such as a blank image or a black image, etc. A user may only continue to seek for or try different connection methods until the multiple screens of the multiple displays are correctly connected and display normally. Therefore, multi-screen connection of multiple displays reduces a user experience. Therefore, how to provide a display system that may detect a connection state between multiple displays and provide a connection prompt image according to the connection state is one of the research focuses of those skilled in the art.

SUMMARY

The invention is directed to a display system and an operation method for the display system, which are adapted to detect a connection state between multiple displays and provide a connection prompt image according to the connection state.

An embodiment of the invention provides a display system including a first display and a second display. The first display includes a first input port and a first output port. The second display includes a second output port, a detection circuit, a processor, and a connection prompt circuit. The detection circuit is coupled to the second output port. The detection circuit drives the second output port in response to a driving signal. The processor is coupled to the second output port. The processor receives a detection signal on the second output port, and determines a connection state of the second output port according to a level of the detection signal. The connection prompt circuit is coupled to the processor. The connection prompt circuit controls the second display to output a connection prompt image according to the connection state. The level of the detection signal changes according to one of the second output port being floating, the second output port being connected to the first input port, and the second output port being connected to the first output port.

An embodiment of the invention provides an operation method for a display system. The display system includes a first display and a second display. The first display includes a first input port and a first output port. The second display includes a second output port. The operation method includes: driving the second output port in response to a driving signal; receiving a detection signal on the second output port, and determining a connection state of the second output port according to a level of the detection signal, wherein the level of the detection signal changes according to one of the second output port being floating, the second output port being connected to the first input port, and the second output port being connected to the first output port; and controlling the second display to output a connection prompt image according to the connection state.

According to the above descriptions, the processor of the second display determines the connection state of the second output port according to the level of the detection signal. The connection prompt circuit of the second display controls the second display to output the connection prompt image according to the connection state. Therefore, the second display may detect the connection state between the first display and the second display and provide the connection prompt image according to the connection state. In this way, in the case of a connection error, the second display may provide the connection prompt image to guide the user to make a correct connection.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Some embodiments of the invention will be described in detail with reference to the accompanying drawings, and the component symbols cited in the following description will be regarded as the same or similar components when the same component symbols appear in different drawings. These embodiments are only part of the invention and do not disclose all possible implementations of the invention. Rather, these embodiments are only exemplary examples within the scope of the patent application of the invention.

Figure 1:
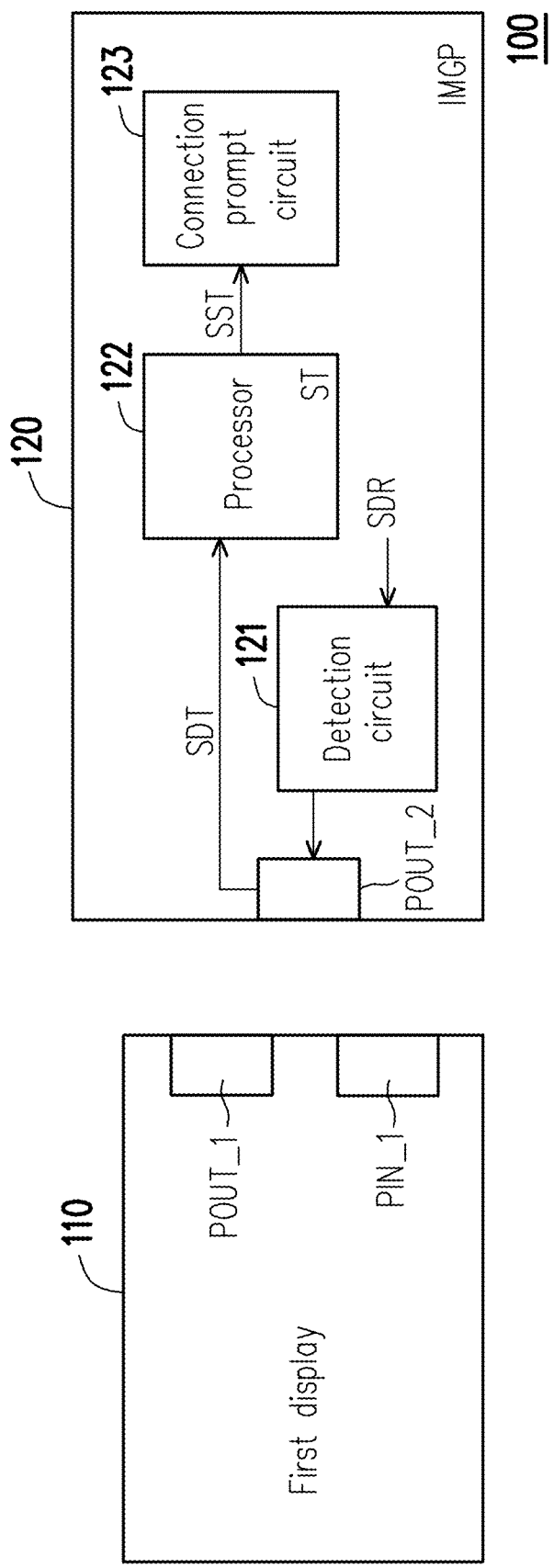
FIG. 1 is a schematic diagram of a display system according to an embodiment of the invention.

Referring to FIG. 1, FIG. 1 is a schematic diagram of a display system according to an embodiment of the invention. In the embodiment, the display system 100 includes a first display 110 and a second display 120. The first display 110 may be a sink display. The second display 120 may be a source display. The first display 110 may receive signals from the second display 120 to provide an audio and video service. The first display 110 includes a first input port PIN_1 and a first output port POUT_1.

In the embodiment, the second display 120 includes a second output port POUT_2, a detection circuit 121, a processor 122 and a connection prompt circuit 123. The detection circuit 121 is coupled to the second output port POUT_2. The detection circuit 121 drives the second output port POUT_2 in response to a driving signal SDR. The processor 122 is coupled to the second output port POUT_2. In the embodiment, a level of a detection signal SDT changes according to one of the second output port POUT_2 being floating, the second output port POUT_2 being connected to the first input port PIN_1, and the second output port POUT_2 being connected to the first output POUT_1. The processor 122 receives the detection signal SDT on the second output port POUT_2. The processor 122 determines a connection state ST of the second output port POUT_2 according to the level of the detection signal SDT. The connection prompt circuit 123 is coupled to the processor 122. The connection prompt circuit 123 controls the second display 120 to output a connection prompt image IMGP according to the connection state ST.

It should be noted that the processor 122 determines the connection state ST of the second output port POUT_2 according to the level of the detection signal SDT. The connection prompt circuit 123 controls the second display 120 to output the connection prompt image IMGP according to the connection state ST of the second output port POUT_2. Therefore, the second display 120 may detect the connection state ST between the first display 110 and the second display 120 and provide the connection prompt image IMGP according to the connection state ST. In this way, in the case of a connection error, the second display 120 may provide the connection prompt image IMGP to guide the user to make a correct connection.

The first display 110 and the second display 120 may be any type of displays or display units provided in an electronic device. The first input port PIN_1, the first output port POUT_1, and the second output port POUT_2 are, for example, respectively a display port (DP), but the invention is not limited thereto.

In the embodiment, the driving signal SDR may be provided by the processor 122 (but the invention is not limited thereto). The driving signal SDR is, for example, a signal with a duty cycle. The processor 122 is, for example, a central processing unit (CPU), or other programmable general-purpose or special-purpose microprocessor, digital signal processor (DSP), programmable controller, application specific integrated circuits (ASIC), programmable logic device (PLD) or other similar devices or combinations of these devices, which may load and execute computer programs.

For example, when the second output port POUT_2 is floating, the detection signal SDT has a first high level and a first low level. When the second output port POUT_2 is connected to the first input port PIN_1, the detection signal SDT has a second high level and a second low level. When the second output port POUT_2 is connected to the first output port POUT_1, the detection signal SDT has a third high level and a third low level. The first highest level, the second highest level and the third highest level are not exactly the same. The first low level, the second low level and the third low level are not exactly the same. Therefore, the processor 122 may learn the connection state ST of the second output port POUT_2 according to the high level of the detection signal SDT and the low level of the detection signal SDT. The processor 122 provides a connection state signal SST corresponding to the connection state ST of the second output port POUT_2.

In the embodiment, the connection prompt circuit 123 receives the connection state signal SST and controls the second display 120 according to the connection state signal SST. For example, when the connection state signal SST corresponds to a first connection state where the second output port POUT_2 is connected to the first input port PIN_1, it represents that the connection of the second output port POUT_2 is correct. The connection prompt circuit 123 may control the second display 120 to provide the connection prompt image IMGP indicating that the second output port POUT_2 is correctly connected to the first input port PIN_1, or not to provide the connection prompt image IMGP.

For another example, when the connection state signal SST corresponds to the second output port POUT_2 being floating, the connection prompt circuit 123 may control the second display 120 to provide the connection prompt image IMGP indicating that the second output port POUT_2 is floating, or not to provide the connection prompt image IMGP.

For another example, when the connection state signal SST corresponds to a second connection state where the second output port POUT_2 is connected to the first output port POUT_1, it represents that a connection error of the second output port POUT_2. Therefore, the connection prompt circuit 123 controls the second display 120 according to the connection state signal SST, and the second display 120 provides the connection prompt image IMGP to guide the user to make a correct connection. In the example, the connection prompt image IMGP displays a pop-up prompt image indicating to connect the second output port POUT_2 to the first input port PIN_1 in a "pop-up" manner (however, the invention is not limited thereto). In this way, when a connection error occurs, the second display 120 may immediately "pop up" the connection prompt image IMGP. The user may view the connection prompt image IMGP and correctly connect the second output port POUT_2 to the first input port PIN_1.

Figure 2:
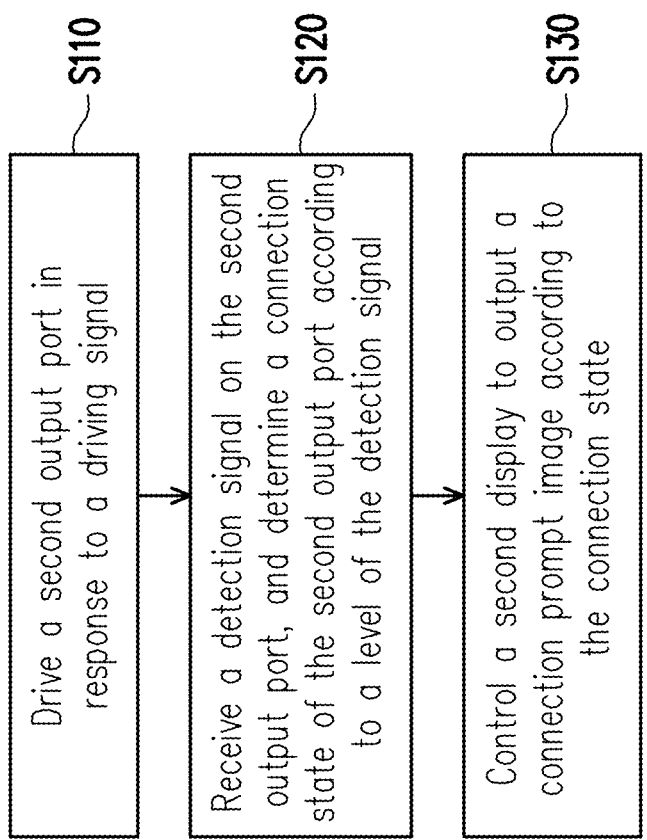
FIG. 2 is a flowchart of an operation method according to an embodiment of the invention.

Referring to FIG. 1 and FIG. 2 at the same time, FIG. 2 is a flowchart of an operation method according to an embodiment of the invention. An operation method S110 is applicable to the display system 100. The operation method S110 includes steps S110, S120, and S130. In step S110, the detection circuit 121 drives the second output port POUT_2 in response to the driving signal SDR. In step S120, the processor 122 receives the detection signal SDT on at the second output port POUT_2, and determines the connection state ST of the second output port POUT_2 according to a level of the detection signal SDT. In step S130, the connection prompt circuit 123 controls the second display 120 to output the connection prompt image IMGP according to the connection state ST of the second output port POUT_2. The implementation examples of steps S110, S120, and S130 have been clearly explained in the embodiment of FIG. 1, and details thereof are not repeated.

Figure 3:
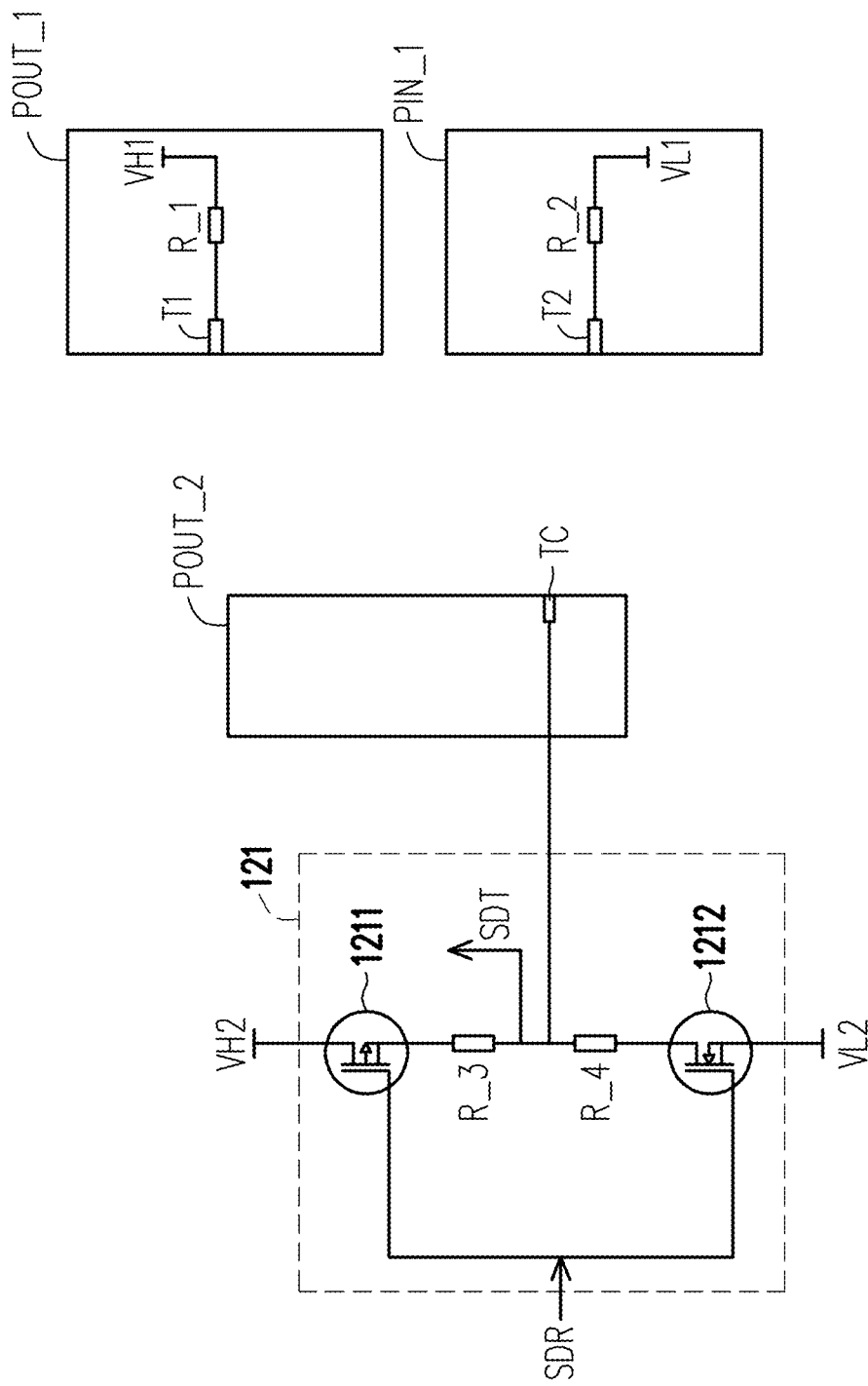
FIG. 3 is a schematic diagram of a first output port, a first input port, a detection circuit and a second output port according to an embodiment of the invention.

Referring to FIG. 1 and FIG. 3 at the same time, FIG. 3 is a schematic diagram of a first output port, a first input port, a detection circuit and a second output port according to an embodiment of the invention. FIG. 3 shows the first input port PIN_1 and the first output port POUT_1 of the first display 110 and the detection circuit 121 and the second output port POUT_2 of the second display 120.

In the embodiment, the first output port POUT_1 includes an output terminal T1 and an output resistor R_1. The output resistor R_1 is coupled between the output terminal T1 and a reference high voltage VH1 of the first display 110. The first input port PIN_1 includes an input terminal T2 and an input resistor R_2. The input resistor R_2 is coupled between the input terminal T2 and a reference low voltage VL1 of the first display 110.

In the embodiment, the detection circuit 121 includes a pull-up circuit 1211, a pull-up resistor R_3, a pull-down resistor R_4 and a pull-down circuit 1212. A first terminal of the pull-up circuit 1211 is coupled to a reference high voltage VH2 of the second display 120. A control terminal of the pull-up circuit 1211 receives the driving signal SDR. The pull-up resistor R_3 is coupled between the second output port POUT_2 and a second terminal of the pull-up circuit 1211. A first terminal of the pull-down resistor R_4 is coupled to the second output port POUT_2. A first terminal of the pull-down circuit 1212 is coupled to a second terminal of the pull-down resistor R_4. A second terminal of the pull-down circuit 1212 is coupled to a reference low voltage VL2 of the second display 120. A control terminal of the pull-down circuit 1212 receives the driving signal SDR.

In the embodiment, a voltage value of the reference high voltage VH2 is equal to a voltage value of the reference high voltage VH1. The voltage values of the reference high voltages VH1 and VH2 are, for example, 3.3 volts (V) respectively, but the invention is not limited thereto. A voltage value of the reference low voltage VL2 is equal to a voltage value of the reference low voltage VL1. The voltage values of the reference low voltages VL1 and VL2 are, for example, 0 V respectively, but the invention is not limited thereto.

In the embodiment, the pull-up circuit 1211 may be implemented by a P-type transistor. For example, the pull-up circuit 1211 may be implemented by a P-type MOS, but the invention is not limited thereto. The pull-down circuit 1212 may be implemented by an N-type transistor. For example, the pull-down circuit 1212 may be implemented by an N-type MOS, but the invention is not limited thereto.

In the embodiment, a resistance value of the output resistor R_1, a resistance value of the pull-up resistor R_3, and a resistance value of the pull-down resistor R_4 are the same as each other. In addition, a resistance value of the input resistor R_2 is different from the resistance value of the output resistor R_1, the resistance value of the pull-up resistor R_3, and the resistance value of the pull-down resistor R_4. In the embodiment, the resistance value of the input resistor R_2 is greater than the resistance value of the output resistor R_1, the resistance value of the pull-up resistor R_3, and the resistance value of the pull-down resistor R_4. For example, the resistance value of the input resistor R_2 is equal to 10 times of the resistance value of the output resistor R_1, the resistance value of the pull-up resistor R_3, and the resistance value of the pull-down resistor R_4, but the invention is not limited thereto. In an embodiment, the resistance value of the input resistor R_2 is smaller than the resistance value of the output resistor R_1, the resistance value of the pull-up resistor R_3, and the resistance value of the pull-down resistor R_4.

In the embodiment, the processor 122 receives the detection signal SDT on a connection terminal TC of the second output port POUT_2. When the detection signal SDT is inverted to the driving signal SDR, it represents that the connection terminal TC of the second output port POUT_2 is not connected to the output terminal T1 of the first output port POUT_1 and the input terminal T2 of the first input port PIN_1. Therefore, the processor 122 provides the connection state signal SST corresponding to floating of the second output port POUT_2.

Figure 4:
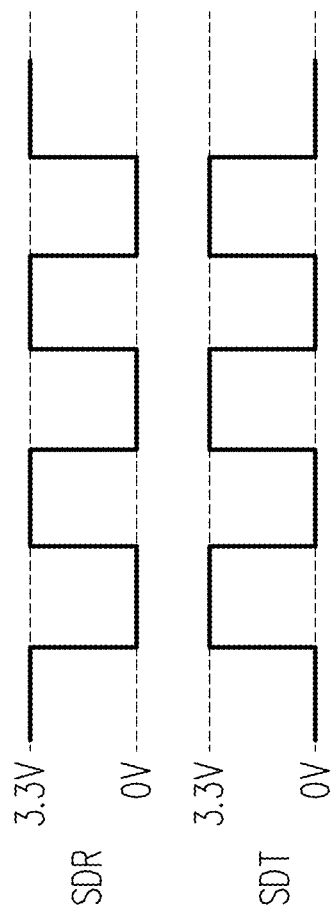
FIG. 4 is a wave pattern diagram according to an embodiment of the invention.

Referring to FIG. 1, FIG. 3, and FIG. 4 at the same time, FIG. 4 is a wave pattern diagram according to an embodiment of the invention. In the embodiment, when the second output port POUT_2 is floating, the detection circuit 121 may be regarded as an inverter. Therefore, when the second output port POUT_2 is floating, the detection signal SDT has a low level (i.e., 0 V) when the drive signal SDR is at a high level (i.e., 3.3 V) and has the high level (i.e., 3.3 V) when the drive signal SDR is at the low level (i.e., 0 V). The processor 122 determines that the second output port POUT_2 is floating according to the above waveform of the detection signal SDT.

Figure 5:
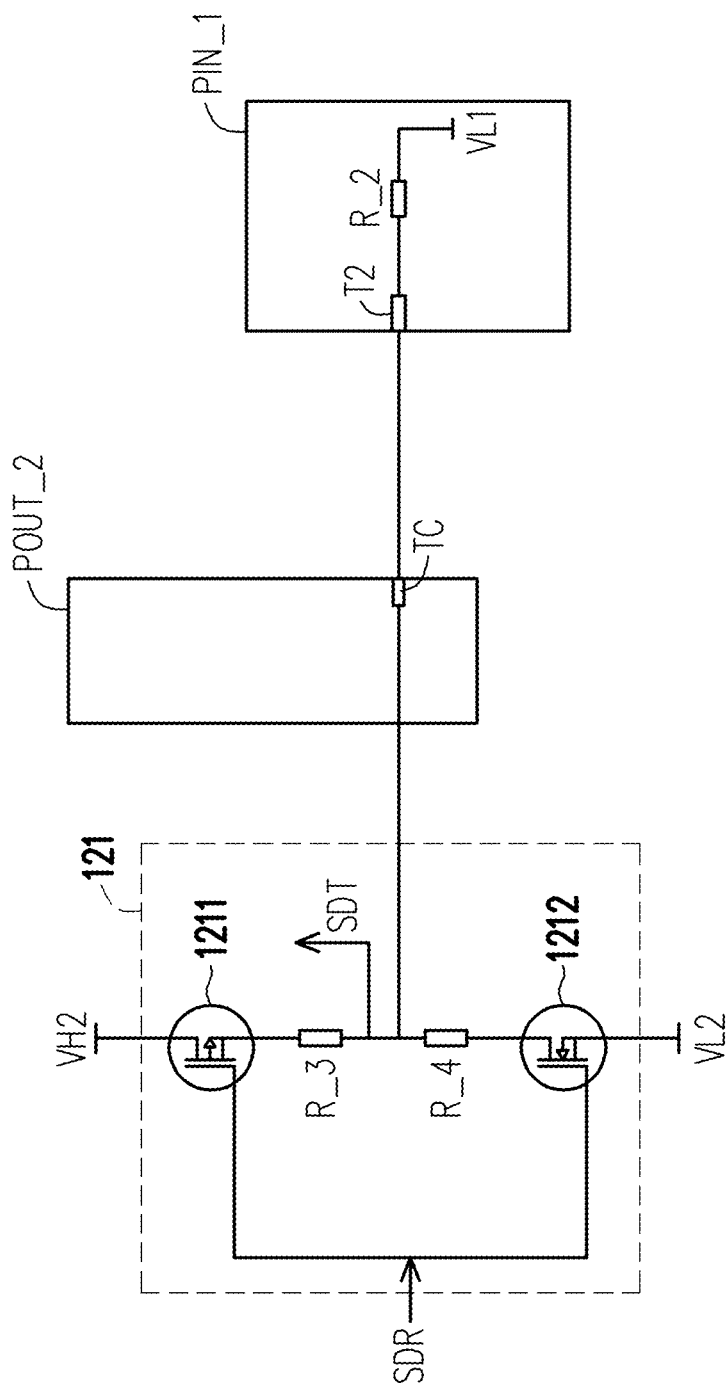
FIG. 5 is a schematic diagram of a correct connection according to an embodiment of the invention.
Figure 6:
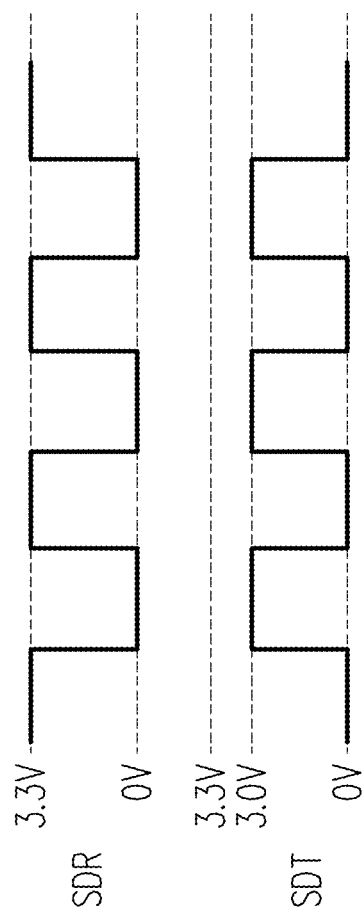
FIG. 6 is a wave pattern diagram illustrated according to FIG. 5.

Referring to FIG. 1, FIG. 5, and FIG. 6 at the same time, FIG. 5 is a schematic diagram of a correct connection according to an embodiment of the invention. FIG. 6 is a wave pattern diagram illustrated according to FIG. 5. In the embodiment, in the first connection state where the second output port POUT_2 is connected to the first input port PIN_1, it represents that the connection of the second output port POUT_2 is correct. It should be noted that in the first connection state where the second output port POUT_2 is connected to the first input port PIN_1, the pull-up resistor R_3 and the pull-down resistor R_4 are respectively connected to the input resistor R_2. The resistance value of the input resistor R_2 is greater than the resistance value of the pull-up resistor R_3 and the resistance value of the pull-down resistor R_4. Therefore, the low-level voltage value of the detection signal SDT is equal to the voltage value of the reference low voltage VL. The high-level voltage value of the detection signal SDT may be divided based on the resistance value of the pull-up resistor R_3 and the resistance value of the input resistor R_2. Therefore, the high-level voltage value of the detection signal SDT is between an intermediate voltage value and the voltage value of the reference high voltage VH. The intermediate voltage value is an intermediate value (i.e., 1.65 V) of the voltage value of the reference low voltage VL (i.e., 0 V) and the voltage value of the reference high voltage VH (i.e., 3.3 V). The processor 122 may provide the connection state signal SST corresponding to the correct connection of the second output port POUT_2 to the first input port PIN_1 according to the waveform of the detection signal SDT shown in FIG. 6.

For example, the resistance value of the input resistor R_2 is designed to be equal to 10 times of the resistance value of the pull-up resistor R_3 (but the invention is not limited thereto). Therefore, the high-level voltage value of the detection signal SDT is, for example, 3 V.

In other words, when the driving signal SDR is at a low level, the high-level voltage value of the detection signal SDT is 3 V. When the driving signal SDR is at a high level, the low-level voltage value of the detection signal SDT is 0 V. Based on the waveform of the detection signal SDT, the processor 122 may determine that the connection of the second output port POUT_2 is correct.

Figure 7:
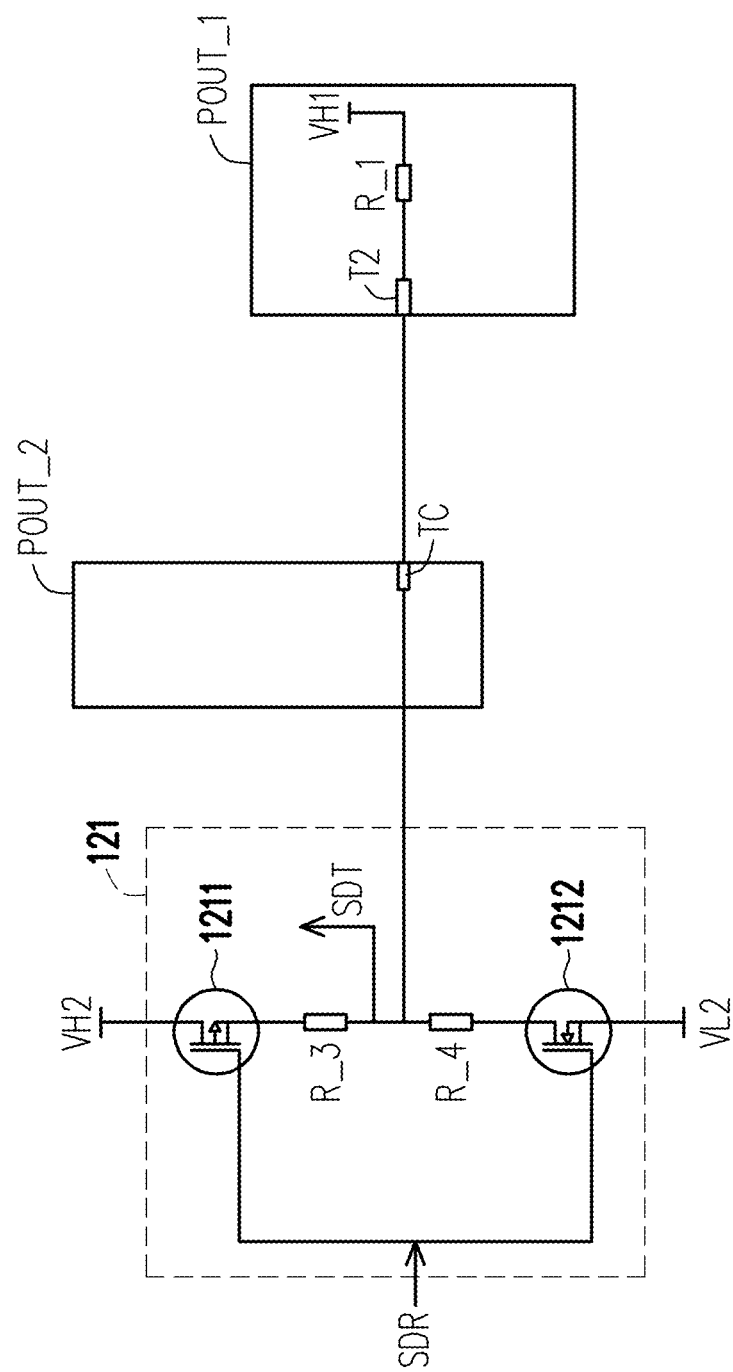
FIG. 7 is a schematic diagram of an incorrect connection according to an embodiment of the invention.
Figure 8:
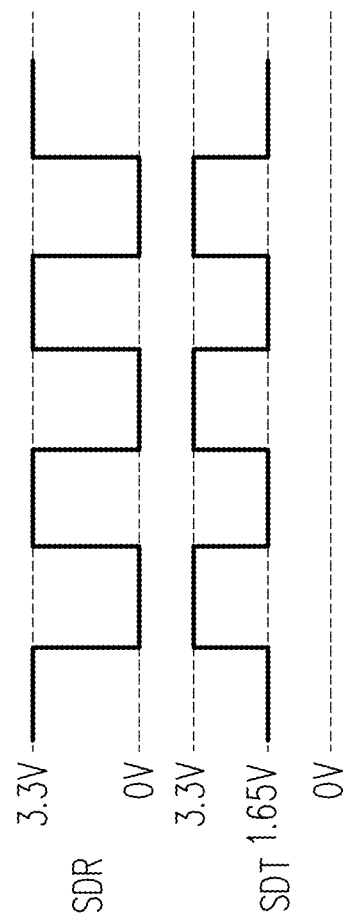
FIG. 8 is a wave pattern diagram illustrated according to FIG. 7.

Referring to FIG. 1, FIG. 7, and FIG. 8 at the same time, FIG. 7 is a schematic diagram of an incorrect connection according to an embodiment of the invention. FIG. 8 is a wave pattern diagram illustrated according to FIG. 7. In the embodiment, in the second connection state where the second output port POUT_2 is connected to the first output port POUT_1, it represents that the connection of the second output port POUT_2 is incorrect.

It should be noted that in the second connection state where the second output port POUT_2 is connected to the first output port POUT_1, the pull-up resistor R_3 and the pull-down resistor R_4 are respectively connected to the output resistor R_1. The resistance value of the output resistor R_1, the resistance value of the pull-up resistor R_3, and the resistance value of the pull-down resistor R_4 are the same as each other. Therefore, the low-level voltage value of the detection signal SDT is equal to the intermediate voltage value of the driving signal SDR (i.e., 1.65 V). The high-level voltage value of the detection signal SDT is equal to the voltage value of the reference high voltage VH (i.e., 3.3 V). The processor 122 may provide the connection state signal SST corresponding to the correct connection of the second output port POUT_2 to the first input port PIN_1 according to the waveform of the detection signal SDT shown in FIG. 8.

In other words, when the driving signal SDR is at a low level, the high-level voltage value of the detection signal SDT is 3.3 V. When the driving signal SDR is at a high level, the low-level voltage value of the detection signal SDT is 1.65 V. Based on the waveform of the detection signal SDT, the processor 122 may determine that the connection of the second output port POUT_2 is incorrect.

In the embodiment, the connection prompt circuit 123 controls the second display 120 to display an error connection prompt image according to the connection state signal SST.

Based on the implementation examples of FIG. 4, FIG. 6 and FIG. 8, the connection states corresponding to the detection signal SDT and the driving signal SDR are as shown in Table 1.

TABLE 1

| Driving signal | Connection state | | |
| --- | --- | --- | --- |
| | Floating of the second output port | Correct connection of the second output port | Connection error of the second output port |
| SDR = 0 V | SDT = 3.3 V | SDT = 3 V | SDT = 3.3 V |
| SDR = 3.3 V | SDT = 0 V | SDT = 0 V | SDT = 1.65 V |

Figure 9:
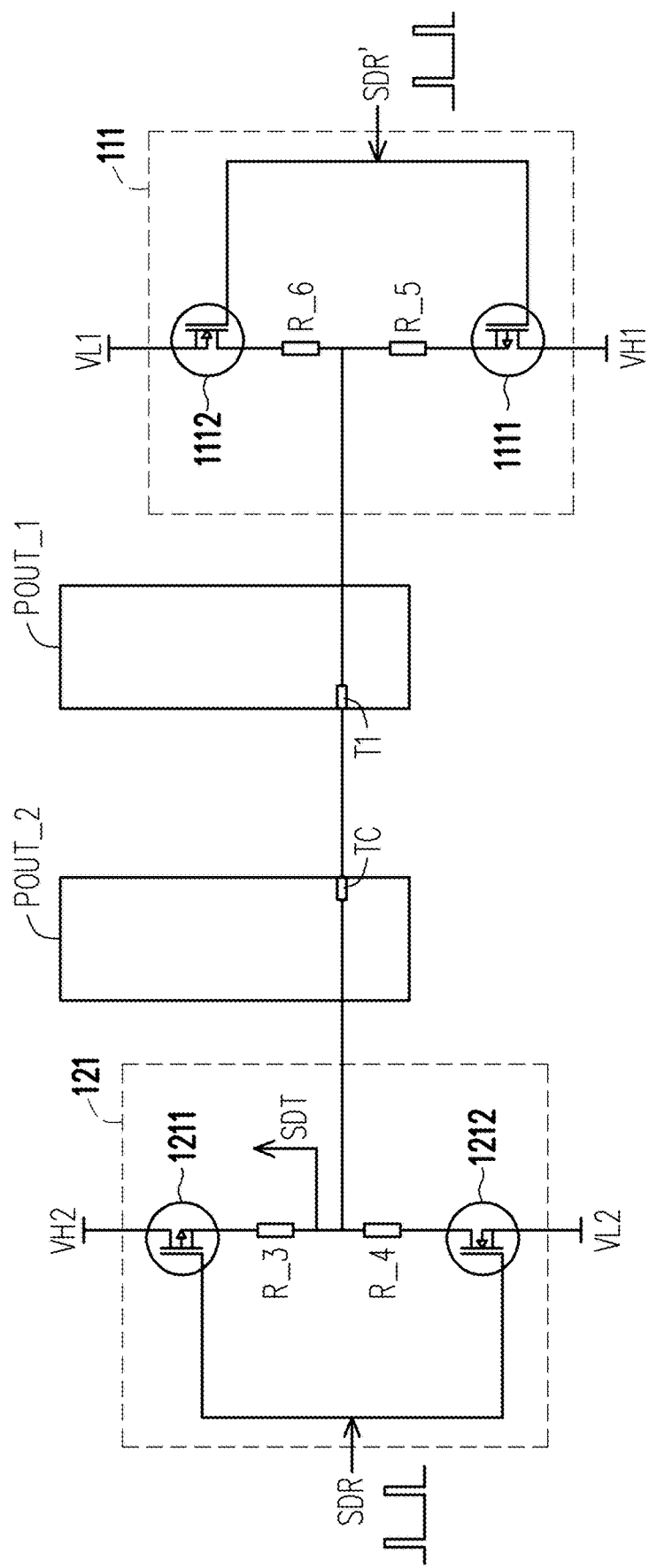
FIG. 9 is a schematic diagram of a detection circuit, a first output port, and a second output port according to an embodiment of the invention.

Referring to FIG. 1 and FIG. 9 at the same time, FIG. 9 is a schematic diagram of a detection circuit, a first output port, and a second output port according to an embodiment of the invention. In the embodiment, the first display 110 further includes a detection circuit 111. The detection circuit 111 includes a pull-up circuit 1111, a pull-up resistor R_5, a pull-down resistor R_6, and a pull-down circuit 1112. A first terminal of the pull-up circuit 1111 is coupled to the reference high voltage VH1 of the first display 110. A control terminal of the pull-up circuit 1111 receives a driving signal SDR' inside the first display 110. The pull-up resistor R_5 is coupled between the first output port POUT_1 and a second terminal of the pull-up circuit 1111. A first terminal of the pull-down resistor R_6 is coupled to the first output port POUT_1. A first terminal of the pull-down circuit 1112 is coupled to a second terminal of the pull-down resistor R_6. A second terminal of the pull-down circuit 1112 is coupled to the reference low voltage VL1 of the first display 110. A control terminal of the pull-down circuit 1112 receives the driving signal SDR'.

In the embodiment, the detection circuit 121 includes a pull-up circuit 1211, a pull-up resistor R_3, a pull-down resistor R_4 and a pull-down circuit 1212. The implementations of the pull-up circuit 1211, the pull-up resistor R_3, the pull-down resistor R_4 and the pull-down circuit 1212 have been clearly explained in the embodiment of FIG. 3, so that details thereof are not repeated here.

In the embodiment, the pull-up circuit 1111 may be implemented by a P-type transistor. For example, the pull-up circuit 1111 may be implemented by a P-type MOS, but the invention is not limited thereto. The pull-down circuit 1112 may be implemented by an N-type transistor. For example, the pull-down circuit 1112 may be implemented by an N-type MOS, but the invention is not limited thereto. In other words, in the embodiment, the first display 110 and the second display 120 have the same design. The resistance value of the pull-up resistor R_5 is the same as the resistance value of the pull-up resistor R_3. The resistance value of the pull-down resistor R_6 is the same as the resistance value of the pull-down resistor R_4.

FIG. 9 shows a second connection state where the second output port POUT_2 is connected to the first output port POUT_1. Such connection state is incorrect. However, it should be noted that since the driving signals SDR and SDR' are respectively generated by different devices, the timings of the driving signals SDR and SDR' cannot be synchronized, which makes the waveform of the detection signal SDT more complex. Based on the incorrect connection in FIG. 9, the waveform of the detection signal SDT is as shown in Table 2.

TABLE 2

| Situation | Driving signal SDR | Driving signal SDR' | Detection signal SDT |
| --- | --- | --- | --- |
| A | 0 V | 3.3 V | 1.65 V |
| B | 0 V | 0 V | 3.3 V |
| C | 3.3 V | 0 V | 1.65 V |
| D | 3.3 V | 3.3 V | 0 V |

In the situation D, when the driving signals SDR and SDR' are both high levels at the same time, the voltage value of the detection signal SDT is 0 V. In the situation B, when the driving signals SDR and SDR' are both low levels at the same time, the voltage value of the detection signal SDT is 3.3 V. This causes the processor 122 to erroneously determine the connection state of the second output port POUT_2 as the second output port POUT_2 being floating based on the situations B and D. The occurrence of situation D must be ruled out.

In the embodiment, in order to reduce the probability of erroneous determination, duty cycles of the high levels (i.e., 3.3V) of the driving signals SDR and SDR' are designed to be less than 10%. Therefore, the probability of occurrence of the situation D is greatly reduced. The probability that the connection state of the second output port POUT_2 is erroneously determined as the second output port POUT_2 being floating will be greatly reduced.

In an embodiment, duty cycles of the high levels (i.e., 3.3V) of the driving signals SDR and SDR' are designed to be less than 5%. In an embodiment, duty cycles of the high levels (i.e., 3.3V) of the driving signals SDR and SDR' are designed to be less than 2% (but the invention is not limited thereto).

Figure 10:
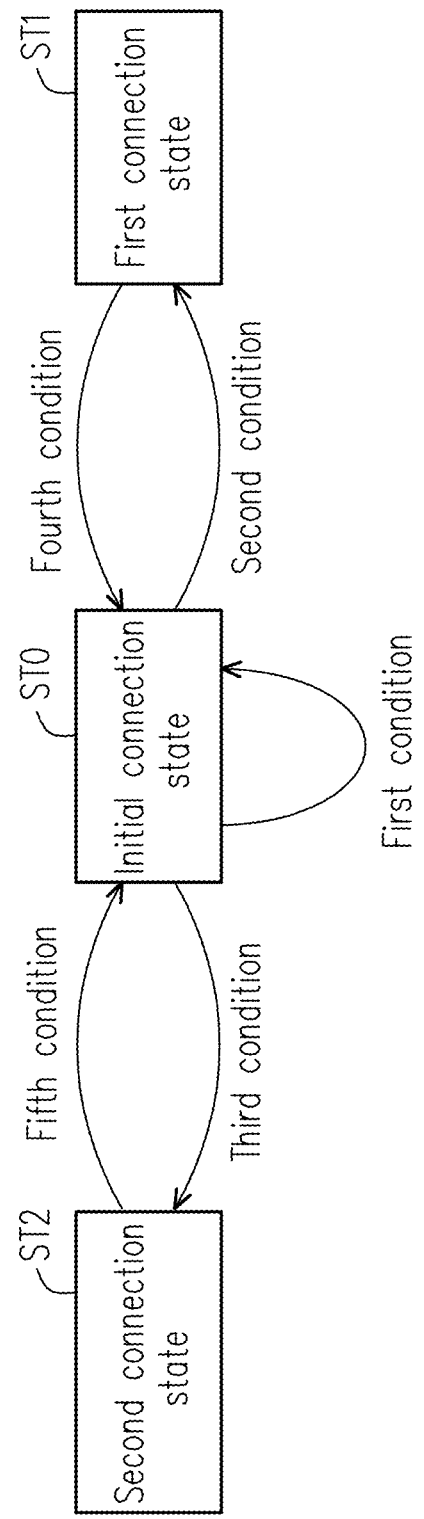
FIG. 10 is a state diagram according to an embodiment of the invention.

Referring to FIG. 1 and FIG. 10 at the same time, FIG. 10 is a state diagram according to an embodiment of the invention. FIG. 10 shows an initial connection state ST0, a first connection state ST1 and a second connection state ST2. The initial connection state ST0, the first connection state ST1, and the second connection state ST2 may be converted through different conditions. In the embodiment, the processor 122 takes the connection state of the second output port POUT_2 being floating as the initial connection state ST0. The processor 122 determines the connection state of the second output port POUT_2 at a high-level mode and a low-level mode of the initial connection state ST0. In the embodiment, the high-level mode is a determination mode where the driving signal SDR is at a high level. The low-level mode is a determination mode where the driving signal SDR is at a low level.

In the initial connection state ST0, when the waveform of the detection signal SDT conforms to a first condition, the processor 122 determines that the second output port POUT_2 remains floating (i.e., remains in the initial connection state ST0). The first condition is that in the low-level mode, the voltage value of the detection signal SDT is equal to the voltage value of the reference high voltage VH (i.e., 3.3 V), and in the high-level mode, the voltage value of the detection signal SDT is not equal to the intermediate voltage value (i.e., 1.65 V). In other words, when the voltage value of the detection signal SDT in the low-level mode is 3.3 V and the voltage value in the high-level mode is not equal to 1.65 V, the processor 122 determines that the second output port POUT_2 remains floating.

In the initial connection state ST0, when the waveform of the detection signal SDT conforms to a second condition, the processor 122 determines that the connection state of the second output port POUT_2 changes from the initial connection state ST0 to the first connection state ST1 (i.e., correct connection state). The second condition is that the voltage value of the detection signal SDT is not equal to the voltage value of the reference high voltage VH in the low-level mode, and the voltage value of the detection signal SDT is not equal to the intermediate voltage value in the high-level mode. In other words, when the voltage value of the detection signal SDT in the low-level mode is not equal to 3.3 V and the voltage value in the high-level mode is not equal to 1.65 V, the processor 122 determines that the second output port POUT_2 is connected to the first input port PIN_1. Therefore, the connection state of the second output port POUT_2 changes from the initial connection state ST0 to the first connection state ST1.

In the initial connection state ST0, when the waveform of the detection signal SDT conforms to a third condition, the processor 122 determines that the connection state of the second output port POUT_2 changes from the initial connection state ST0 to the second connection state ST2 (i.e. incorrect connection state). The third condition is that the voltage value of the detection signal SDT is equal to the intermediate voltage value in the high-level mode. In other words, when the voltage value of the detection signal SDT in the high-level mode is equal to 1.65 V, the processor 122 determines that the second output port POUT_2 is connected to the first output port POUT_1. Therefore, the connection state of the second output port POUT_2 changes from the initial connection state ST0 to the second connection state ST2.

In the first connection state ST1, the processor 122 may reduce the duty cycle of the high level (i.e., 3.3V) of the driving signal SDR to 0%. In other words, the level of the driving signal SDR in the first connection state ST1 is maintained at a low level. In this way, in the first connection state ST1, the detection signal SDT is, for example, maintained to 3 V. Furthermore, interference in signal transmission may be avoided.

In the first connection state ST1, when the waveform of the detection signal SDT conforms to a fourth condition, the processor 122 determines that the connection state of the second output port POUT_2 changes from the first connection state ST1 to the initial connection state ST0. The fourth condition is that the voltage value of the detection signal SDT is equal to the voltage value of the reference high voltage VH (i.e., 3.3 V) in the low-level mode. In other words, when the voltage value of the detection signal SDT changes from 3 V to 3.3 V in the low-level mode, the processor 122 determines that the second output port POUT_2 is floating (for example, the correct connection between the second output port POUT_2 and the first input port PIN_1 is removed). Therefore, the connection state of the second output port POUT_2 returns from the first connection state ST1 to the initial connection state ST0.

In the second connection state ST2, when the waveform of the detection signal SDT conforms to a fifth condition for a predetermined consecutive number of times, the processor 122 determines that the connection state of the second output port POUT_2 changes from the second connection state ST2 to the initial connection state ST0. The fifth condition is that in the low-level mode, the voltage value of the detection signal SDT is equal to the voltage value of the reference high voltage VH (i.e., 3.3 V), and in the high-level mode, the voltage value of the detection signal SDT is equal to the voltage value of the reference low voltage VL (i.e., 0 V).

For example, the predetermined consecutive number of times may be set to 5. When the voltage value of the detection signal SDT in the low-level mode is 3.3 V and the voltage value in the high-level mode is equal to 0 V, and when the fifth condition occurs for five times in a row, the processor 122 determines that the second output port POUT_2 is floating (for example, the incorrect connection between the second output port POUT_2 and the first output port POUT_2 is removed).

Figure 11:
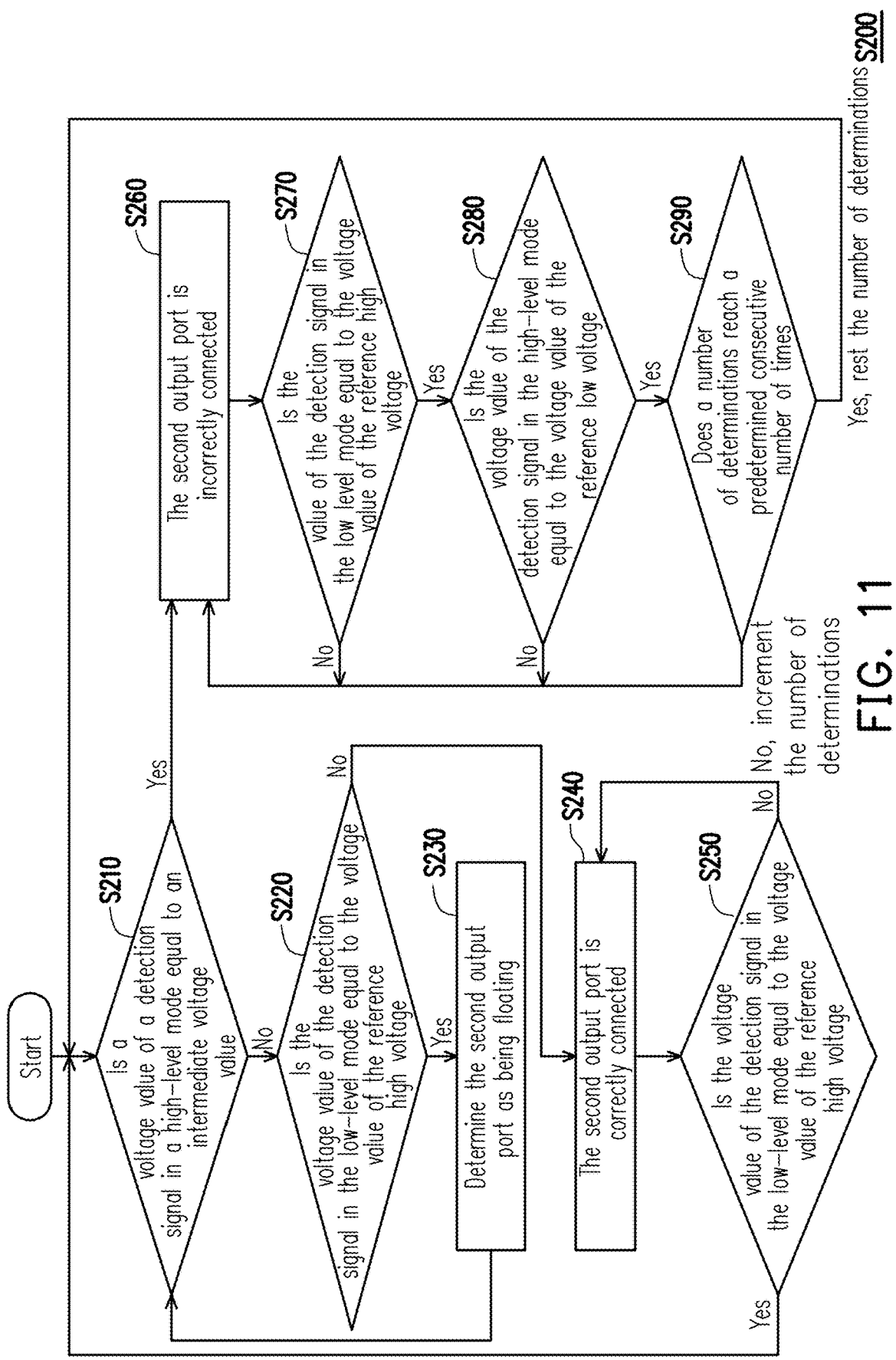
FIG. 11 is a flowchart of an operation method according to an embodiment of the invention.

Refer to FIG. 1, FIG. 10, and FIG. 11 at the same time, FIG. 11 is a flowchart of an operation method according to an embodiment of the invention. In the embodiment, an operation method S200 includes steps S210 to S290. In step S210, the processor 122 receives the detection signal SDT in the initial connection state ST0 and determines whether the voltage value of the detection signal SDT in the high-level mode is equal to the intermediate voltage value (i.e., 1.65 V). When the voltage value of the detection signal SDT in the high-level mode is not equal to the intermediate voltage value, the processor 122 determines the voltage value of the detection signal SDT in the low-level mode in step S220. In the initial connection state ST0, the processor 122 determines whether the voltage value of the detection signal SDT in the low-level mode is equal to the voltage value of the reference high voltage VH (i.e., 3.3 V). When the voltage value of the detection signal SDT in the high-level mode is equal to the voltage value of the reference high voltage VH, the processor 122 determines that the second output port POUT_2 remains floating (i.e., remains in the initial connection state ST0). Then, the processor 122 may return to the operation of step S210.

In the embodiment, steps S210 and S220 are determination operations in the initial connection state ST0.

Referring back to step S220, when the voltage value of the detection signal SDT in the high-level mode is not equal to the voltage value of the reference high voltage VH, the processor 122 determines in step S240 that the second output port POUT_2 is correctly connected to the first input port PIN_1 (i.e., the first connection state ST1). In addition, in step S240, the processor 122 reduces the duty cycle of the high level (i.e., 3.3V) of the driving signal SDR to 0%. Then, the processor 122 determines in step S250 whether the voltage value of the detection signal SDT in the low-level mode is equal to the voltage value of the reference high voltage VH (i.e., 3.3 V). When the voltage value of the detection signal SDT in the low-level mode is not equal to the voltage value of the reference high voltage VH, the processor 122 determines that the second output port POUT_2 remains a correct connection (i.e., remains the first connection state ST1). Then, the processor 122 returns to the operation of step S240.

On the other hand, in step S250, when the voltage value of the detection signal SDT in the low-level mode is equal to the voltage value of the reference high voltage VH, the processor 122 determines that the second output port POUT_2 is floating. Then, the processor 122 returns to the operation of step S210. In other words, the connection state of the second output port POUT_2 returns from the first connection state ST1 to the initial connection state ST0.

In the embodiment, step S250 is a determination operation in the first connection state ST1.

Referring back to step S210, in the initial connection state ST0, when the voltage value of the detection signal SDT in the high-level mode is equal to the intermediate voltage value, the processor 122 determines in step S260 that the second output port POUT_2 is incorrectly connected to first output port POUT_1. Therefore, the connection state of the second output port POUT_2 enters the second connection state ST2 from the initial connection state ST0. Then, the processor 122 determines in step S270 whether the voltage value of the detection signal SDT in the low level mode is equal to the voltage value of the reference high voltage VH. When the voltage value of the detection signal SDT is not equal to the voltage value of the reference high voltage VH, the processor 122 returns to the operation of step S260. On the other hand, when the voltage value of the detection signal SDT is equal to the voltage value of the reference high voltage VH, the processor 122 determines the voltage value of the detection signal SDT in the high-level mode in step S280.

In the second connection state ST2, in step S280, the processor 122 determines whether the voltage value of the detection signal SDT in the high-level mode is equal to the voltage value of the reference low voltage VL. When the voltage value of the detection signal SDT in the high-level mode is not equal to the voltage value of the reference low voltage VL, the processor 122 returns to the operation of step S260. On the other hand, when the voltage value of the detection signal SDT in the high-level mode is equal to the voltage value of the reference low voltage VL, the processor 122 determines in step S290 whether a number of determinations reaches a predetermined consecutive number of times. When the number of determinations has not reached the predetermined consecutive number of times, the processor 122 increments the number of determinations and returns to the operation of step S260. On the other hand, when the number of determinations reaches the predetermined consecutive number of times, the processor 122 resets the number of determinations (for example, resets the number of determinations to zero) and returns to the operation of step S210. In other words, the connection state of the second output port POUT_2 returns from the second connection state ST2 to the initial connection state ST0.

In the embodiment, steps S270 to S290 are determination operations in the second connection state ST2.

Figure 12:
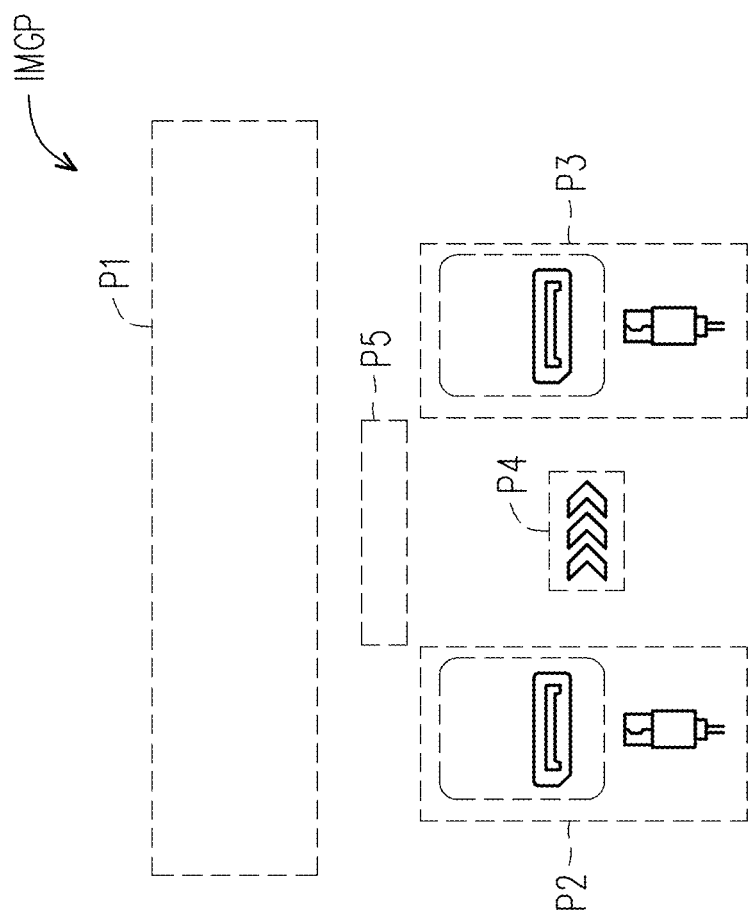
FIG. 12 is a schematic diagram of a connection prompt image according to an embodiment of the invention.

Referring to FIG. 1 and FIG. 12 at the same time, FIG. 12 is a schematic diagram of a connection prompt image according to an embodiment of the invention. In the embodiment, when the connection state signal SST corresponds to the second connection state where the second output port POUT_2 is connected to the first output port POUT_1, it indicates that the connection of the second output port POUT_2 is incorrect. Therefore, the connection prompt circuit 123 controls the second display 120 according to the connection state signal SST, and the second display 120 provides the connection prompt screen IMGP to guide the user to make a correct connection. In the embodiment, the connection prompt image IMGP includes five prompt parts P1 to P5. The prompt part P1 displays a description of the incorrect connection of the second output port POUT_2. For example, the prompt part P1 displays a text related to the incorrect connection of the second output port POUT_2. The prompt part P2 displays the current incorrect connection of the second output port POUT_2. For example, the prompt part P2 graphically displays the incorrect connection of the second output port POUT_2. For another example, the prompt part P2 displays the incorrect connection of the second output port POUT_2 in a text or by an LED light circuit turning on/off.

The prompt part P3 shows the correct connection method of the second output port POUT_2. For example, the prompt part P3 graphically displays the correct connection method of the second output port POUT_2. For another example, the prompt part P3 displays the correct connection method of the second output port POUT_2 in a text or by an LED light circuit turning on/off.

The prompt part P4 displays an icon of a switching direction. The switching direction in the prompt part P4 points from the prompt part P2 to the prompt part P3. For another example, the prompt part P4 adopts the LED light circuit turning on/off to show the correct connection method related to the switching direction. Therefore, the user may intuitively know that the incorrect connection of the prompt part P2 must be changed to the correct connection of the prompt part P3.

The prompt part P5 displays position information of the first input port PIN_1. For example, the prompt part P5 displays information about a front side of the first display 110. Taking the front side of the first display 110 as an example, the first input port PIN_1 is located on a right side of the first display 110. The first output port POUT_1 is located on a left side of the first display 110. Therefore, a position of the prompt part P2 on the left side corresponds to a position of the first output port POUT_1. A position of the prompt part P3 located on the right side corresponds to a position of the first input port PIN_1. Therefore, the user may clearly know the position of the first input port PIN_1 according to the connection prompt image IMGP.

In summary, the second display includes a second output port, a processor, and a connection prompt circuit. The processor of the second display determines a connection state of the second output port according to a level of the detection signal. The connection prompt circuit controls the second display to output the connection prompt image according to the connection state. The second display may provide the connection prompt image according to the connection state between the first display and the second display. In this way, in the case of a connection error, the second display may provide the connection prompt image to guide the user to make a correct connection.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A display system, comprising:
    a first display, comprising:
        a first input port; and
        a first output port; and
    a second display, comprising:
        a second output port;
        a detection circuit, coupled to the second output port and configured to drive the second output port in response to a driving signal;
        a processor, coupled to the second output port, and configured to receive a detection signal on the second output port and determine a connection state of the second output port according to a level of the detection signal, wherein the processor provides the driving signal; and
        a connection prompt circuit, coupled to the processor and configured to control the second display to output a connection prompt image according to the connection state,
    wherein the level of the detection signal changes according to one of the second output port being floating, the second output port being connected to the first input port, and the second output port being connected to the first output port.

2. The display system as claimed in claim 1, wherein a duty cycle of a high level of the driving signal is lower than 10%.

3. The display system as claimed in claim 2, wherein in response to the second output port being determined to be connected to the first input port, the processor reduces the duty cycle to 0%.

4. The display system as claimed in claim 1, wherein the detection circuit comprises:
    a pull-up circuit, having a first terminal coupled to a reference high voltage of the second display and a control terminal receiving the driving signal;
    a pull-up resistor, coupled between the second output port and a second terminal of the pull-up circuit;
    a pull-down resistor, having a first terminal coupled to the second output port; and
    a pull-down circuit, having a first terminal coupled to a second terminal of the pull-down resistor, a second terminal coupled to a reference low voltage of the second display, and a control terminal receiving the driving signal.

5. The display system as claimed in claim 4, wherein:
    the first input port comprises:
        an input terminal; and
        an input resistor, coupled between the input terminal and a reference low voltage of the first display, and
    the first output port comprises:
        an output terminal; and
        an output resistor, coupled between the output terminal and a reference high voltage of the first display.

6. The display system as claimed in claim 5, wherein:
    in response to the detection signal being inverted with the driving signal, the processor provides a connection state signal corresponding to the second output port being floating, and
    the connection prompt circuit controls the second display to display the connection prompt image according to the connection state signal corresponding to the second output port being floating.

7. The display system as claimed in claim 5, wherein:
    a resistance value of the pull-up resistor, a resistance value of the pull-down resistor, and a resistance value of the output resistor are the same as each other, and
    a resistance value of the input resistor is greater than the resistance value of the pull-up resistor, the resistance value of the pull-down resistor, and the resistance value of the output resistor.

8. The display system as claimed in claim 7, wherein:
    in response to a low-level voltage value of the detection signal being equal to a voltage value of the reference low voltage and a high-level voltage value of the detection signal being between an intermediate voltage value and a voltage value of the reference high voltage, the processor provides a connection state signal corresponding to the second output port being connected to the first input port, and
    the intermediate voltage value is an intermediate value between the voltage value of the reference low voltage and the voltage value of the reference high voltage.

9. The display system as claimed in claim 7, wherein:
    in response to a low-level voltage value of the detection signal being equal to an intermediate voltage value of the reference high voltage and the reference low voltage and a high-level voltage value of the detection signal being equal to a voltage value of the reference high voltage, the processor provides a connection state signal corresponding to the second output port being connected to the first output port,
    the connection prompt circuit controls the second display to display an error connection prompt image according to the connection state signal corresponding to the second output port being connected to the first output port, and
    the intermediate voltage value is an intermediate value between a voltage value of the reference low voltage and a voltage value of the reference high voltage.

10. The display system as claimed in claim 7, wherein:
    the processor takes a connection state of the second output port being floating as an initial connection state, and determines the connection state of the second output port at a high-level mode and a low-level mode of the initial connection state,
    the high-level mode is a determination mode where the driving signal is at a high level, and
    the low-level mode is a determination mode where the driving signal is at a low level.

11. The display system as claimed in claim 10, wherein in the initial connection state:
    in response to the voltage value of the detection signal being equal to the voltage value of the reference high voltage in the low-level mode, and in response to the voltage value of the detection signal being not equal to an intermediate voltage value in the high-level mode, the processor determines that the second output port is floating, wherein the intermediate voltage value is an intermediate value between a voltage value of the reference low voltage and a voltage value of the reference high voltage.

12. The display system as claimed in claim 11, wherein in the initial connection state:
in response to the voltage value of the detection signal being equal to the intermediate voltage value in the high-level mode, the processor determines that the second output port is connected to the first output port.

13. The display system as claimed in claim 11, wherein in the initial connection state:
in response to the voltage value of the detection signal being not equal to the voltage value of the reference high voltage in the low-level mode and the voltage value of the detection signal being not equal to the intermediate voltage value in the high-level mode, the processor determines that the second output port is connected to the first input port.

14. An operation method for a display system, wherein the display system comprises a first display and a second display, wherein the first display comprises a first input port and a first output port, and the second display comprises a second output port, a detection circuit, a processor, and a connection prompt circuit, the operation method comprising:
driving, by the detection circuit, the second output port in response to a driving signal;
receiving, by the processor, a detection signal on the second output port;
determining, by the processor, a connection state of the second output port according to a level of the detection signal, wherein the level of the detection signal changes according to one of the second output port being floating, the second output port being connected to the first input port, and the second output port being connected to the first output port; and
controlling, by the connection prompt circuit, the second display to output a connection prompt image according to the connection state.

15. The operation method as claimed in claim 14, wherein the step of determining the connection state of the second output port according to the level of the detection signal comprises:
taking the connection state of the second output port being floating as an initial connection state; and
determining the connection state of the second output port at a high-level mode and a low-level mode of the initial connection state,
wherein the high-level mode is a determination mode where the driving signal is at a high level, and
the low-level mode is a determination mode where the driving signal is at a low level.

16. The operation method as claimed in claim 15, wherein the step of determining the connection state of the second output port according to the level of the detection signal further comprises:
in the initial connection state, in response to the voltage value of the detection signal being equal to the voltage value of the reference high voltage in the low-level mode and the voltage value of the detection signal being not equal to an intermediate voltage value in the high-level mode, determining that the second output port is floating,
wherein the intermediate voltage value is an intermediate value between a voltage value of the reference low voltage and a voltage value of the reference high voltage.

17. The operation method as claimed in claim 16, wherein the step of determining the connection state of the second output port according to the level of the detection signal further comprises:
in the initial connection state, in response to the voltage value of the detection signal being equal to the intermediate voltage value in the high-level mode, determining that the second output port is connected to the first output port.

18. The operation method as claimed in claim 16, wherein the step of determining the connection state of the second output port according to the level of the detection signal further comprises:
in the initial connection state, in response to the voltage value of the detection signal being not equal to the voltage value of the reference high voltage in the low-level mode and the voltage value of the detection signal being not equal to the intermediate voltage value in the high-level mode, determining that the second output port is connected to the first input port.

19. The operation method as claimed in claim 14, further comprising:
in response to the second output port being determined to be connected to the first input port, reducing a duty cycle of a high level of the driving signal to 0%.

* * * * *